May 9, 1939. L. H. JONES 2,157,340
METHOD AND MEANS FOR SUPPORTING POTTED PLANTS
Filed June 24, 1936
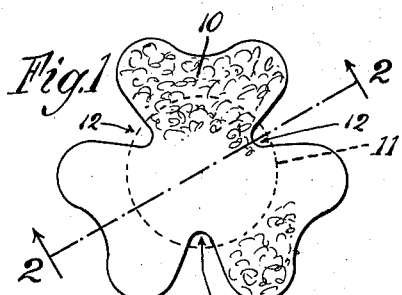
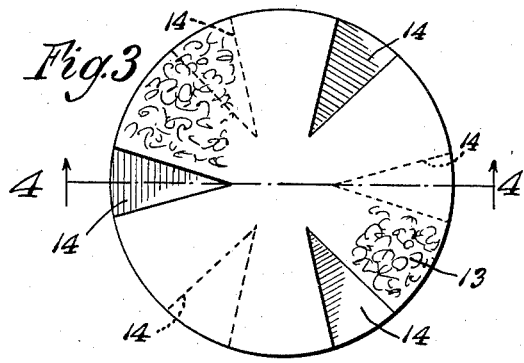
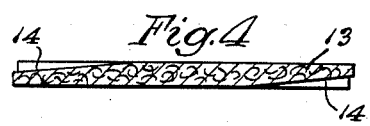
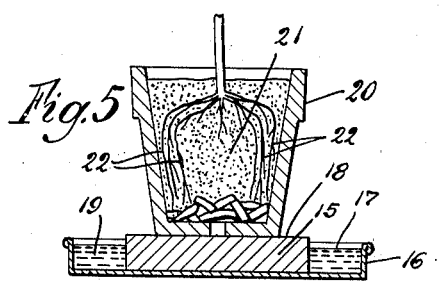
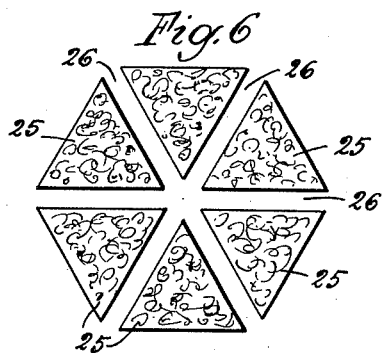
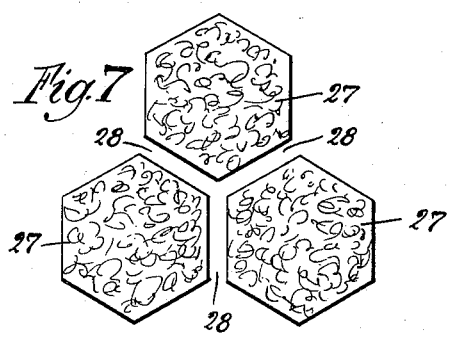
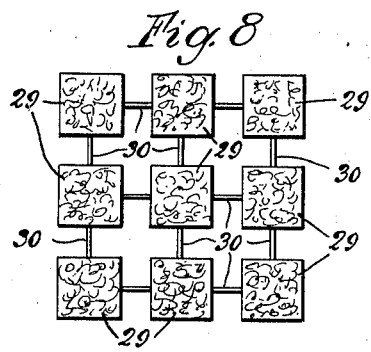
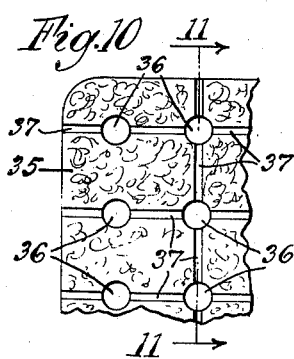
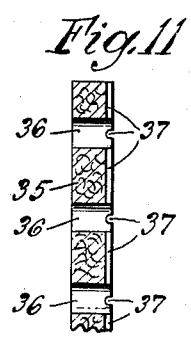
Inventor
Linus H. Jones
by W. Bartlett Jones
Attorney.

Patented May 9, 1939

2,157,340

UNITED STATES PATENT OFFICE 2,157,340

METHOD AND MEANS FOR SUPPORTING POTTED PLANTS

Linus H. Jones, Amherst, Mass., assignor to W. Bartlett Jones, Chicago, Ill.

Application June 24, 1936, Serial No. 86,897

15 Claims. (Cl. 47—38)

The present invention relates to foundations for supporting pots of a porous nature with growing plants therein, such as the common clay pot for house plants.

It has been ascertained that a large proportion of water added daily to a clay-potted plant, standing on a dry surface, is taken up by the pot and lost to the air by evaporation. The clay material is a powerful absorbent of water, and an excellent dispenser of water vapor. Over the course of a short time it becomes practically dry and in so doing it draws water from the contents of the pot. A migration of water thus occurs from inside the contents of the pot to the wall of the pot. This migrating water carries soluble nutrients with it, and as the water is lost at the wall, the action concentrates the nutrients near or in the pot wall. This action gradually causes heaviest root growth near the pot wall. It empties the central portion of nutrients, and hence the roots there are few. Therefore, when the wall becomes dry, the major portion of the plant's roots are exposed to dry conditions, whereas they should be in moist surroundings. All this leads to dwindling, dying or poor plants. Water applied daily to such dried pots strikes into the surface of the dirt. It has been ascertained that much of the water used daily fails to reach the inner central part of the pot contents, going rather to the drier walls and contents adjacent the walls.

Where plants are in non-porous containers the root-growth is distributed differently than in clay pots, extending uniformly throughout the dirt, rather than encasing the dirt. The clay pot is frequently called "porous", but this signifies porosity to water, not to air. A dry clay pot is porous to air, but a moist clay pot is not porous to air. By keeping a clay pot always moist, its thirst for water does not take the water from the dirt and from the roots, but rather may yield water to them, if the dirt dries out.

The present invention aims to keep the porous pot moist, and to provide an independent source of water for the pot, in addition to the water intended normally for the contents of the pot.

The common practice of greenhouse growers is to place the pots on or in moist beds of sand, earth or cinders. This accomplishes the same end as the present invention, but strangely, it has not been sufficiently appreciated as to lead to a like practice in the home. Greenhouses are more humid than homes or offices, and in a greenhouse the loss of water from clay pots is less than in homes or offices. As a result, plants in clay pots taken from the greenhouse condition into a home quickly dwindle or die, even though they are daily watered. This has been attributed to the dryness of the atmosphere. And this is true, but it is the dryness acting on the pot material, rather than upon the foliage of the plant. With adequate soil moisture, the dryness of the atmosphere does not kill the plant.

There is a practice of setting clay pots in water in a saucer. This may cure the dryness of the pot, but it introduces another trouble. Clay pots have a hole in the bottom. The water is thus taken up by the dirt acting as a sponge, and too much water in the dirt results. This gives the plant "wet feet" and produces yellowing and other bad effects.

By means of the present invention there is provided a pool of water in a reservoir, such as a shallow dish or saucer, as a source of water to keep the pot sides moist. As a sort of valve between this water and the pot, there is used an absorbent foundation mat capable of acting as a wick to raise water above the level of the pool. The pad is thus always moist, but is not a source of free water. The mat is of such material that it may support the pot directly and maintain its solidity, firmness and function for a long period of time. The mat is also of a form which remains firm when wet to keep the pot set on an even level over a long period of time. The foundation may be a single flat, spherically concave, solid, or it may be built up of adjacent units.

Numerous materials may be used. A porous earthen body is suitable, such as of material like the clay pot itself. Certain fiber-base compositions have been used, like the common semi-hard more or less porous insulating boards of wood fiber or wood pulp, when adequately lacking in water-proofing agents. Leather bodies are highly satisfactory, and leather board compounded in whole or in part of scrap leather is suitable. Leather is particularly retentive of water at high capacity when exposed to free water. It is tough and firm and is an excellent material. Its usual tanned condition makes it resist mold and decay for a long time. The fibrous type of mat is preferred to the earthenware forms since it assures more perfect contact with the bottoms of clay pots, which may be quite irregular. Fiber or softer cushioning wick material may be interposed between clay or earthen mats and the pot, to overcome irregularities in either and insure adequate contact area.

Various forms may be used. The area of the foundation may be greater or less than the area of the pot set upon it. However, a greater area is preferred to assure an adequate interface for transmission of moisture. This preferred area is best provided in a single unit for a single pot. Such form therefore requires that some of the mat project from beneath the bottom of the pot. It has been found that in such instances in fibrous bodies, the uncovered parts of a single unit may curl upwardly, due to a greater soaking or swelling at the bottom than at the top. The use of old coffee-cup saucers as reservoirs for mats also creates a tendency to dish. For example, if a flat circular mat larger than the circle base of a clay pot is used initially, it may eventually form a dished mat in which the flower pot sets. This will easily lead the user to water the reservoir about the pad to a level higher than the bottom of the dished mat, or to carelessly water the pool so as to fill the dished mat, forming a pool of water in which the pot will set. To avoid this condition drainage means are provided in such mat where this may occur. Practically, it is desirable to make an article which is simple, cheap and fool-proof. Several specific forms or combinations are therefore set forth as illustrations of the invention.

Fig. 1 represents a plan view of an aesthetic and functional modification of a circular disk mat provided with a form to permit drainage.

Fig. 2 represents a cross-section on line 2—2 of the mat of Fig. 1.

Fig. 3 represents a circular mat with a drainage groove therein.

Fig. 4 is a cross-section of the mat of Fig. 3 on line 4—4 thereof.

Fig. 5 represents a mat in combination with a more shallow saucer as it is used for a clay pot.

Figs. 6, 7 and 8 represent other physical forms and arrangements of units so set with spaces between them, as to provide drainage for the foundation.

Fig. 9 shows a modification of the edge of a mat.

Fig. 10 represents a corner of a large mat provided with holes and irrigation channels to the holes.

Fig. 11 is a cross-section of the mat of Fig. 10 on line 11—11.

In Fig. 1 a fibrous mat 10 has a clover-leaf form upon which a pot base of size 11 (dotted circle) may be placed. The "leaves" of the form project beyond the pot base, and the recesses 12 provide channels to drain away any water which could otherwise collect on the mat if it became dished and had no such drainage means. The form is generally scalloped and the recesses provide more space for water. The deeper recesses 12 also function to lead free water nearer the center of the mat.

In Fig. 4 a circular form 13 is shown in which inclined drainage grooves 14 are formed in the top and/or bottom surface. Such a form may be the same size or smaller than the base of the pot, in which case there will be no opportunity for it to become dished. Yet the channels 14 have the function of leading water from the pool to the interior of the mat for absorption.

In Fig. 5 an earthenware pad 15 like the pot material itself is shown in a saucer 16 the water level edge 17 of which is lower than the top-most surface 18 of the pad. This particular combination assures proper application of water to avoid covering the mat when placing the water 19 into the saucer 16. A clay pot 20 rests on the mat.

The dirt 21 in the pot is illustrated largely as a core inside the root system 22 of the plant. This indicates the actual condition found in clay-potted plants which is one of the leading causes for quick injury to the plant by dry side-walls. Drying but once is enough to produce an injury.

The combination illustrated in Fig. 5 may serve to a slight extent to provide the dirt with water, but when proper surface watering is practiced, it will be found that the water from the pool 19 largely supplies the pot, and prevents it from absorbing water applied to the contents. The plant may thus develop and grow in a more natural condition, in the dry atmosphere of a home or office.

In Fig. 6 a plurality of flat triangular solid mats 25 are shown. These may be nested together in various ways to make larger foundations. Spaces 26 may be left between them to provide access of water to the edges of the units.

In Fig. 7 hexagonal forms 27 are shown with spaces 28, as in Fig. 6. In Fig. 8, other shapes are represented by squares 29. Mechanical links 30 such as wires, cord or chains are shown to make large unitary mats.

In Fig. 9 two adjacent units 31 and 32 are shown with a V-shaped edge 33, which may be formed on one or both of the abutting pieces.

Fig. 10 represents a large mat 35 as for store counters or benches in a shop, greenhouse or home, which may be set in a tray. Clay, fiber, leatherboard or other suitable hydrophilic material may be used. Holes 36 are present in the mat to increase reservoir space for water. In order to permit filling these holes by merely filling the tray, there are provided in one face of the board, preferably for the bottom of the mat, grooves or irrigation channels 37 leading from the edge to the holes.

The results of using the invention are remarkable and may be found pictorially illustrated in "Florists Exchange and Horticultural Trade World" for April 11, 1936. Pictures are shown with two begonias in 5-inch pots, originally practically equivalent in size and history, with 50 and 52 blossoms respectively. These were given identical care, one on a dry surface, and one on a leatherboard mat as shown in Fig. 1, from December 19th to the following March 20th. The one on the dry surface increased its blossoms from 50 to 146, while the one on the moist mat increased its blossoms from 52 to 322, with a corresponding increase in size and foliage. Other plants in like tests showed these comparative changes in the winter months when results are most difficult to attain.

| Plant | Size of pot | Condition | Days | Change |
|---|---|---|---|---|
| Begonia | 3-inch | Dry | 83 | 20 to 24 blossoms. |
| Do | ---do--- | Wet | 83 | 20 to 102 blossoms. |
| Geranium | 4-inch | Dry | 80 | 41 to 78 leaves. 1 flower stalk. |
| Do | ---do--- | Wet | 80 | 40 to 103 leaves. 4 flower stalks. |
| Primula | ---do--- | Dry | 44 | 3 to 15 flower stalks. |
| Do | ---do--- | Wet | 44 | 2 to 42 flower stalks. |

It may also be stated with reference to such illustrations that the plants were nourished in the same way on a properly selected plant food composition, so that the only variable was water.

The use of moist earth, sand, or cinders in greenhouses is recognized as an effective means for similar results, but such material is not suitable for household uses where single plants are most frequently employed. The loose material is soft and yielding. Pots may not set level when the base is highly moistened, and the material adheres to and crawls on the pots giving them a dirty and untidy appearance. The larger mats are also more desirable in greenhouses and florists' shops for the same reasons, since they provide at all times clean pots for better appearance and for ready sale.

Other substances such as pebbles and sponge rubber are not satisfactory. These present films of free water which is to be avoided. Pebbles, glass beads, sponge rubber and other materials differ from the strictly hydrophilic solids which love water and attract it, whether by capillarity, hydration, imhibition or other particular process. Rubber compositions are quite hydrophobic and tend to repel water, leaving water in contact with it as a film or globule of free water. The materials must soak up water to become moist. The solid must lift water from a pool by a sort of wick-action, and hold the lifted water within the material itself, or the minute spaces within it, without leading to substantial loss of the firmness or solidity of the material. The wick-action provides a control valve and a pump, as it were, to lift limited amounts of water from the pool to the pot, in quantities limited to avoid "wet feet" for the plant. The invention may be carried out in numerous ways with various materials as will be readily appreciated by those skilled in the art.

I claim:

1. A foundation for porous pots for plants comprising a dish-like container for providing a pool of water, and a water-absorbent solid mat supported in said container for presenting a pot-supporting surface above the level of the pool, with its body in said pool, said supported mat being adapted to carry the weight of a potted plant.

2. A foundation for porous pots for plants comprising a dish-like container for providing a pool of water, and water-absorbent mat means supported in said container, said supported means presenting a supporting foundation for a potted plant above the level of the pool and having its body in said pool.

3. A foundation for porous pots for plants comprising a dish-like container for providing a pool of water, and water absorbent mat means resting in said container and presenting above the water level of the sides of said container a supporting foundation for a potted plant.

4. A foundation for porous pots for plants comprising a dish-like container for providing a pool of water, and a water absorbent fibrous mat resting in said container and presenting above the water level of the pool a supporting foundation for a potted plant, said mat being provided with a channel from the interior surface area thereof for drainage of water in the event the mat assumes an upwardly dished form, and to provide easy access of water to the inner areas of the mat.

5. A foundation for porous pots for plants comprising a dish-like container for providing a pool of water, and a water absorbent fibrous mat resting in said container and presenting above the level of the pool a supporting foundation for a potted plant, said mat having a recess from the edge inwardly to provide a channel for drainage of water in the event the mat assumes an upwardly dished form, and to provide easy access of water to the inner areas of the mat.

6. A moisture-providing support for porous pots for plants, comprising a normally flat solid water absorbent fibrous mat provided with one or more channels from the interior surface area thereof for water in the event the mat assumes an upwardly dished form, and to provide easy access of water to the inner areas of the mat, said mat being capable of retaining its general form and of providing a solid fixed support for a potted plant when resting in a pool of water.

7. A moisture-providing foundation for porous pots for plants comprising a solid water absorbent mat having recesses extending from the edge to the interior thereof for providing access of water to the inner areas of the mat.

8. A moisture-providing foundation for porous pots for plants comprising one or more solid water absorbent mats arranged to define a supporting area for potted plants, said area being characterized at its boundary by recessed regions inwardly thereof whereby water in which the mat may set, may reach the inner regions of the mat for absorption and transmission to porous pots which may be set on said foundation.

9. A moisture-providing foundation for porous pots for plants comprising a solid water absorbent mat having recesses extending from the edge to the interior thereof for providing access of water to the inner areas of the mat, and a water-container for supporting said mat.

10. A moisture-providing foundation for porous pots for plants comprising one or more solid water absorbent mats arranged to define a supporting area for potted plants, said area being characterized at its boundary by recessed regions inwardly thereof whereby water in which the mat may set, may reach the inner regions of the mat for absorption and transmission to porous pots which may be set on said foundation, and a water-container for supporting said mat.

11. A moisture-providing foundation for porous pots for plants comprising a solid water absorbent mat having recesses extending from the edge to the interior thereof for providing access of water to the inner areas of the mat, and a water-container for supporting said mat, said container being such as to prevent a water level above the pot-supporting area of the mat.

12. A moisture-providing foundation for porous pots for plants comprising one or more solid water absorbent mats arranged to define a supporting area for potted plants, said area being characterized at its boundary by recessed regions inwardly thereof whereby water in which the mat may set, may reach the inner regions of the mat for absorption and transmission to porous pots which may be set on said foundation, and a water-container for supporting said mat, said container being such as to prevent a water level above the pot-supporting area of the mat.

13. A mat for supporting porous pots containing growing plants which comprises a solid hydrophilic sheet of water-insoluble material which maintains its solidity when wet, said sheet being characterized by holes therethrough for water reservoirs.

14. A mat for supporting porous pots containing growing plants which comprises a solid hydrophilic sheet of water-insoluble material which maintains its solidity when wet, said sheet being characterized by holes therethrough for water reservoirs and by irrigation channels from said holes to the edges of the sheet, whereby upon immersing the sheet in a tray of water, water is carried to the holes in the area of the sheet.

15. The method of providing water to the walls of a porous pot containing a growing plant which comprises supporting a hydrophilic solid in a pool of water with the top of the solid above the level of the pool, whereby the solid absorbs water and forms an elevated moist surface, and supporting a clay pot upon said solid in direct contact with said surface, whereby the solid slowly lifts water from the pool and acts as a valve in transmitting water to the bottom of the pot for absorption thereby.

LINUS H. JONES.